United States Patent [19]

Siegel

[11] 4,283,626

[45] Aug. 11, 1981

[54] METHODS AND APPARATUS FOR ANALYSIS OF MIXTURES BY MASS SPECTROMETRY

[75] Inventor: Melvin W. Siegel, Pittsburgh, Pa.

[73] Assignee: Extranuclear Laboratories, Inc., Pittsburgh, Pa.

[21] Appl. No.: 92,559

[22] Filed: Nov. 8, 1979

[51] Int. Cl.³ .............................................. B01D 59/44

[52] U.S. Cl. .................................... 250/292; 250/282; 250/290

[58] Field of Search ................ 250/290, 292, 282, 822

[56] References Cited

U.S. PATENT DOCUMENTS

| | | | |
|---|---|---|---|
| 3,147,445 | 9/1964 | Wuerker | 250/292 |
| 3,505,516 | 4/1970 | Gielow et al. | 250/291 |
| 3,867,632 | 2/1975 | Fite | 250/282 |

*Primary Examiner*—Harold A. Dixon

*Attorney, Agent, or Firm*—Mason, Mason and Albright

[57] ABSTRACT

Apparatus for analyzing components in a mixture by the steps of introducing the mixture into the ion source of a mass spectrometer, ionizing some of the individual molecules representative of the mixture, using the mass spectrometer to select a beam of ions of a single ion mass which may be characteristic of a target compound in the mixture, passing the resultant single-mass beam of ions through a gas-filled collision chamber, and then, using a second mass spectrometer, determining the mass spectrum of the collision fragment ions to confirm the identity of the target compound, and by measuring the intensity of all or part of the mass spectrum, determine its concentration or amount in the original sample mixture. The same apparatus is suitable for fundamental measurements of the collision processes, which in addition to fragmentation include ion molecule reactions, charge changing collisions, and others, in addition to analytical applications. The collision region simultaneously provides collision gas confinement, primary and fragment ion confinement, variability of collision energy, and variability of drift field in the collision chamber. It is composed of a leaky dielectric material, in the form of a cylindrical tube joining the exit of the first quadrupole mass spectrometer to the entrance of the second mass spectrometer. Methods of data collection and handling are also disclosed.

21 Claims, 3 Drawing Figures

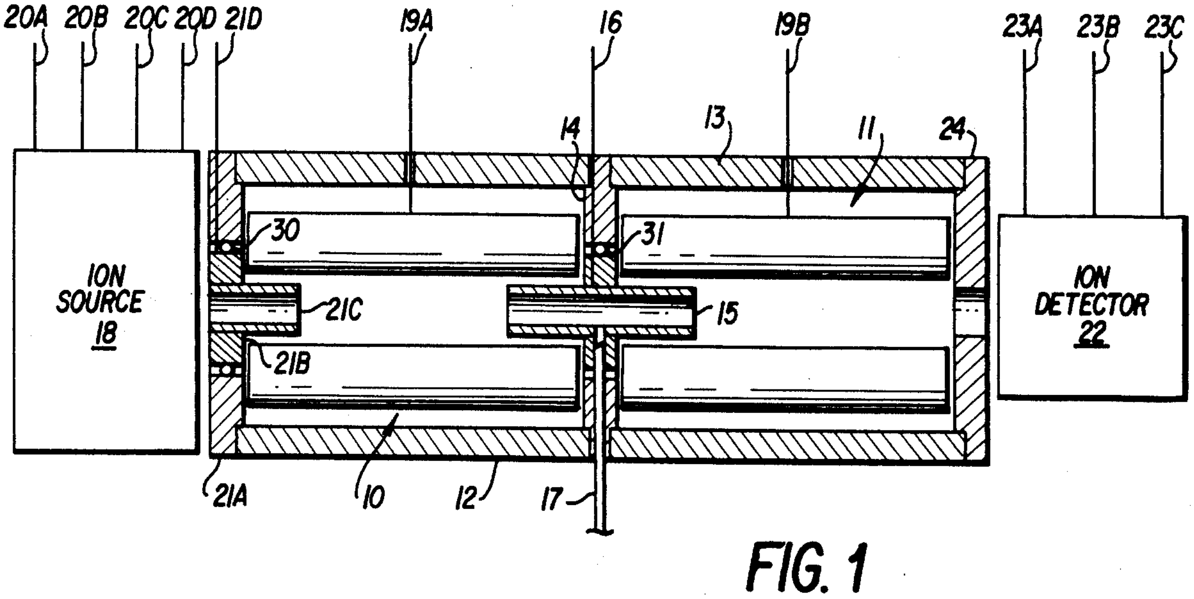
FIG. 1
FIG. 2
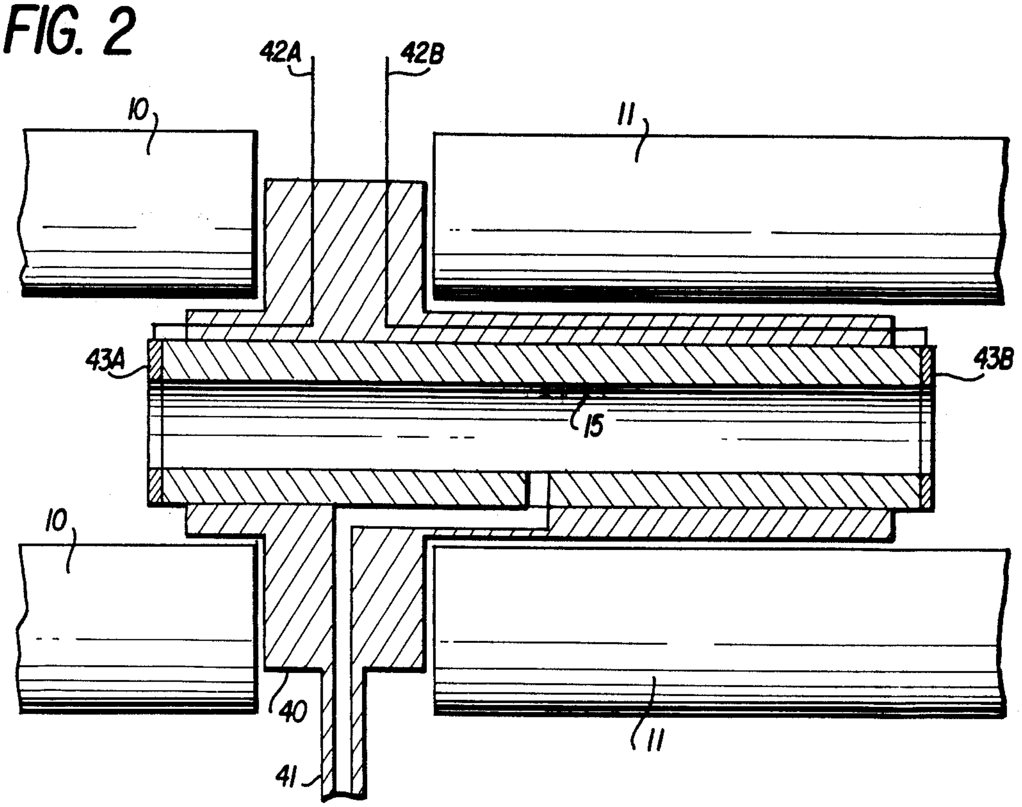

METHODS AND APPARATUS FOR ANALYSIS OF MIXTURES BY MASS SPECTROMETRY

BACKGROUND OF THE INVENTION

1. Field of the Invention

The invention relates to the field of analytical mass spectrometry. Specifically it introduces new apparatus and methods for rapid identification and quantification of target compounds in a mixture by means of selection of a single mass ion beam from the multi-mass ion beam derived from the mixture, and further analyzing the single mass ion beam by controlled collision in a gas cell, followed by mass analysis of the resulting fragment ions and other secondary ions. More specifically, the invention relates to a unique new type of collision cell, which allows analytical and economic advantages over previous embodiments of the mass spectrometry—collisional fragmentation—mass spectrometry concept. Furthermore, the invention relates to new methods of automated apparatus control and data collection.

2. Discussion of the Prior Art

Many versions of ion selection—ion collision—fragment ion mass analysis systems for chemical mixture analysis have been described, for example, in the review article by R. G. Cooks in National Bureau of Standards Special Publication 519, Trace Organic Analysis: A New Frontier in Analytical Chemistry, Proceedings of the 9th Materials Research Symposium, April 10-13, 1978, (Issued April 1979). Most versions use one or another form of magnetic mass spectrometer instrument. More recently, several laboratories have described quadrupole mass spectrometer based systems, for example, R. A. Yost and C. G. Enke writing in Analytical Chemistry, 51, 1251A-1274A (1979). The consistent feature of these systems is the use of three quadrupoles in tandem. The first quadrupole is operated in the normal manner, in which both RF and DC voltages are imposed on the rods, and sufficient resolution (determined by the ratio of DC to peak RF voltage) is chosen to select one ion mass for injection into the second quadrupole. The second quadrupole is operated in a well-known but less usual manner, in which no DC voltage, and only a relatively small RF voltage, is imposed on the rods. In this mode, the quadrupole acts as a high pass mass filter, i.e., the amplitude of the RF voltage determines the lowest mass that can successfully traverse the length of the rods, lower masses being rejected and higher masses being transmitted. In these embodiments of the concept, the collision gas is introduced into the enclosure of the second quadrupole, and the amplitude of the RF voltage is chosen sufficiently small that even the low mass collision fragment ions are transmitted. The third quadrupole, operated in the normal manner, then serves to produce a mass specturm of the collision fragment ions emerging from the second quadrupole.

SUMMARY OF THE INVENTION

The major innovation of the present invention is the elimination of the middle, or RF-only quadrupole which serves as the collision chamber in the prior art. In the present invention, two quadrupoles, each operated in the normal manner, are connected in tandem by a tube of "leaky dielectric" material such as that described by W. L. Fite in "Methods and Apparatus for Spatial Separation of AC and DC Electrical Fields with Application to Fringe Fields in Quadrupole Mass Filters", Ser. No. 346,250, U.S. Pat. No. 3,867,632, Filed Mar. 30, 1973, Issued Feb. 18, 1975; "Division of Ser. No. 346,250 U.S. Pat. No. 3,867,632—Methods and Apparatus for Spatial Separation of AC and DC Electric Fields with Application to Fringe Fields in Quadrupole Mass Filters", Ser. No. 539,587, U.S. Pat. No. 4,013,887 Filed Jan. 8, 1975, Issued Mar. 22, 1977; "Methods and Apparatus for Spatial Separation of AC and DC Electric Fields, with Application to Fringe Fields in Quadrupole Mass Filters", Ser. No. 502,158, U.S. Pat. No. 3,937,954, Filed Aug. 30, 1974, Issued Feb. 10, 1976; and "Method and Apparatus for Improved Focusing of Ion Currents in Quadrupole Mass Filter", Ser. No. 531,375, U.S. Pat. No. 3,936,634, Filed Dec. 10, 1974, Issued Feb. 3, 1976. This material has a ratio of conductivity to dielectric constant selected to make it appear a conductor at low frequencies (such as to the quadrupole DC field), but an insulator at high frequencies (such as to the quadrupole RF field). It thus serves to shield the region it encloses from the DC field, but not from the RF field, i.e., the region inside this tube contains an RF electric field very similar to the "RF-only" electric field found in the middle quadrupole of the prior art. Collision gas is easily introduced into this tube, which then serves as the collision cell. This represents a considerable saving in expense (two rather than three quadrupoles are used), size (the apparatus is shortened to two-thirds its initial length), external driving electronics (the RF supply for the middle quadrupole is eliminated), and complexity of operation. Additionally, there are other advantages and capabilities not taught by prior art embodiments. These include:

(1) The collision energy is easily changed, by appropriately biasing the leaky dielectric tube with respect to the potential on the axis of either quadrupole.

(2) If desirable for analytical or fundamental research purposes, a drift field is easily imposed by making electrical connections to entrance and exit ends of the tube and causing a current to flow in either direction as may be appropriate. (Compare w/U.S. Pat. No. 4,126,781, M. W. Siegel).

(3) The collision gas is better confined than in the three quadrupole configuration.

A subsidiary innovation concerns the method of utilizing the apparatus to most conveniently collect and present the data. The method involves the utilization of any existing computer data system intended for gas chromatography-mass spectrometry (GC/MS). These data systems are designed to scan a mass spectrometer rapidly (typically taking about 0.5 sec for a complete scan) and to store in sequence the mass spectra so obtained over an extended period, up to several hours, corresponding to somewhat more than the elution time of the most highly retained component of the mixture injected into the gas chromatograph. Such a system is easily and simply augmented, according to the present invention, so as systematically to record the full range of data available from a mass spectrometer—collision chamber—mass spectrometer instrument. The method is as follows: the data system controls, in an entirely ordinary manner, the second quadrupole mass spectrometer, by means of, for example, outputting a 0-10 volt analog signal which drives the mass spectrometer through its 0-1000 amu mass range. Now, by either additional hardware or by additional software, the scan number is counted or accumulated digitally, and converted to an analog voltage appropriate for controlling the first quadrupole mass spectrometer. For example, if each scan of the second mass spectrometer lasts 0.5 seconds, then in 100 seconds 200 scans are accumulated. If for each scan of the second mass spectrometer the referenced analog voltage is incremented by 0.01 volts, then the analog voltage will, in 100 seconds. go in steps of 0.01 volt from 0.00 to 1.99 volts. If this is used to control the first mass spectrometer, which may be set up so that 10 volts again correspond to 1000 amu, then the first mass spectrometer will then in 100 seconds scan from 0 to 199 amu, this corresponding to the spectrum of primary (uncollided) ions. For each uncollided ion species, there will then be stored at a corresponding time (or scan number) a complete spectrum of the collision fragment ions. Other capablilities of the data system, such as single ion reconstructed gas chromatogram, may be used in obviously useful ways. It is interesting to note that use of the (total ion) reconstructed gas chromatogram (RGC) feature available on most GC/MS data systems will result in presenting a reconstructed mass spectrum of the primary (uncollided) ions.

BRIEF DESCRIPTION OF THE DRAWINGS

FIG. 1 is a representation of the essential features of the apparatus described, depicting two tandem quadrupole mass spectrometers linked by a tube of leaky dielectric material provided with a gas inlet and a connection for electrical biasing. Also shown are the location of the ionizer and leaky dielectric ion injection tube at the entrance to the first quadrupole, and a symbolic representation of the ion detection apparatus at the exit of the second quadrupole. For simplicity the ancillary vacuum system, electrical feed-throughs, etc., are omitted.

FIG. 2 is an enlarged representation of the leaky dielectric collision cell in an embodiment employing non-symmetrical disposition with respect to the first and second quadrupoles, and electrical connections to both ends of the chamber so as to provide a drift field superimposed on the electrical bias.

DESCRIPTION OF THE PREFERRED EMBODIMENTS

Figure 3:
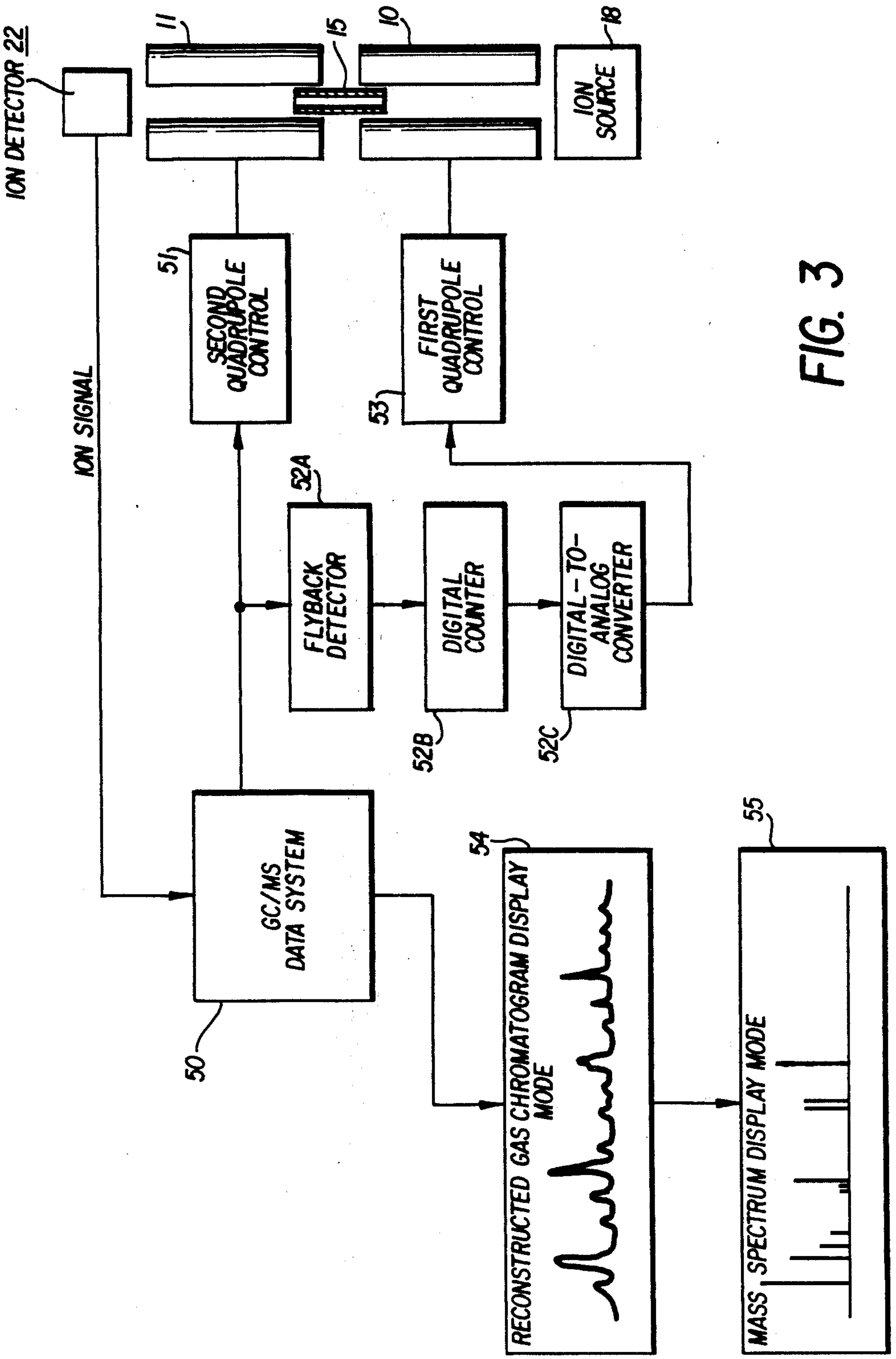
FIG. 3 is a block diagram depiction of the data collection method proposed herein, wherein a GC/MS Data System is used to operate the second quadrupole in the conventional manner, and the mass scan flybacks are detected, counted, and converted to an analog signal (proportional to the number of scans elapsed), controlling the first quadrupole. Two forms of data output are depicted. The first uses the "Reconstructed Gas Chromatogram" feature common to most GC/MS Data Systems, and the display is essentially a reconstructed mass spectrum of all the ions produced by ionization of the initial sample mixture. The second selects a single stored spectrum originating on a single ion mass in the primary spectrum.

FIG. 1 depicts the general arrangement of the mass spectrometer-collision cell- mass spectrometer envisioned. Basic parts include an ion source (18), the first quadrupole or primary ion selector 10, the collision cell (15), the second quadrupole, or fragment ion selector 11, and the ion detector 22. Electrical leads 20A, 20B, 20C, and 20D schematically depict the connections required to operate the ion source. The first quadrupole consists of an appropriate mechanical structure 21A, which in some embodiments may be suitable for mounting the ionizer, an electrically isolated central portion 21B in which is mounted, with good electrical contact, a short leaky dielectric cylinder 21C, and is provided with an electrical lead 21D for establishing the electrical potential of the short leaky dielectric cylinder 21C; the electrical isolation may be provided by any of several means well known in the art, one of which is herein depicted as a ruby or sapphire ball 30. The first quadrupole case 12 is provided with appropriately located holes for connection of the electrical leads symbolized by 19A.

The second quadrupole 11 is similarly enclosed by a case 13 and provided with electrical connection 19B. Ion detector 22 is symbolically provided with electrical leads 23A, 23B, 23C, and may be conveniently mounted on the second quadrupole exit plate 24.

Disposed between the two quadrupoles is a plate 14 which serves multiple functions: it is the exit plate for the first quadrupole, it is the entrance plate for the second quadrupole, and it is the mounting plate for the collision chamber 15. The collision chamber is provided with an electrically insulating gas inlet tube 17 which may conveniently be constructed of glass, ceramic, or possibly a plastic such as teflon more-or-less compatible with the vacuum environment. The collision chamber is electrically isolated from the plate 14 which carries it, and is provided with an electrical lead 16 for establishing its potential. This mechanical and electrical design can be accomplished in numerous ways, one appropriate one being the use of ruby or saphire balls symbolized by 31.

The apparatus depicted in practice is installed in a vacuum system equipped with vacuum pumps, electrical feed-throughs, mechanical feed-throughs gas feed-throughs, etc., for purposes and using methods which are well known in the art, and therefore are not explicitly depicted herein. In certain instances, for example, if ion source 18 is of a high-pressure type such as is common in the art of chemical ionization, it is advantageous for the vacuum system to consist of differentially pumped sections, using methods and apparatus which are well known.

FIG. 2 is an enlarged and additionally detailed representation of the central portion of this apparatus, showing those portions designated first quadrupole 10, second quadrupole 11, and collision chamber 15. Certain additional and option features of the envisioned apparatus are included here. The collision cell 15 is here shown asymmetrically disposed between the two quadrupoles, an arrangement which may have practical advantages in obtaining high ion transmission, inasmuch as there is a tendency for the lighter fragment ions to be lost in the higher RF field in the region of the collision cell protruding into the first quadrupole 10, while at the same time these fragment ions are confined and guided by the weaker RF field generally prevailing in the region of the collision cell protruding into the second quadrupole 11. The collision gas carrying channel 41 is now shown as machined into the electrically isolated collision cell carrier 40, this carrier being made of an insulating material such as but not limited to machinable glass ceramic (Corning "MACOR"). The gas carrying channel 41 is shown as delivering gas more-or-less into the center of the collision chamber, to maximize the gas pressure in the center of the chamber while minimizing the gas load on the vacuum pumping system. In this embodiment, the collision chamber 40 is provided with two electrical leads 42A and 42B leading respectively to two electrical contacts 43A and 43B, one to each end of the collision chamber 40, each connection being made by means of any of several well known means, such as silver-loaded conductive paint or epoxy. By connecting the leads 42A and 43B to two appropriately selected DC electrical power sources, such as batteries or regulated power supplies, the collision cell may then be provided with a bias voltage for controlling the mean collision energy of primary ions on collision gas, and a drift field for the purpose of aiding or retarding the motion of one or several ion species, as well as providing an additional measure of control over the dynamics of the collision process.

FIG. 3 depicts the use of the mass spectrometer—collision cell—mass spectrometer apparatus with a computer data system of the type well known in the field of gas chromatography—mass spectrometry (GC-MS). The previously discussed ion source 18, first quadrupole 10, collision cell 15, second quadrupole 11, and ion detector 22 are shown disposed with respect to each other as they would be in practice, with the vacuum system, etc., omitted for clarity and simplicity. The GC/MS Data System, or another data system more specifically intended for mass spectrometry—collisional fragmentation—mass spectrometry 50, accepts in any of several well known manners the ion signal from detector 22. The mass command signal passes in the usual manner to the second quadrupole control unit 51, whereby mass spectra of fragment ions are collected repetitively and relative rapidly, for example, one mass spectrum per 0.5 second.

The mass command signal may also be communicated to a chain of electronic modules which perform in turn the functions of flyback detection 52A, i.e., detection of the end of each mass scan, digital counting 52B, i.e., recording and display of the number of mass cans completed by the second quadrupole, and analog-to-digital conversion 52C, i.e., the synthesis of a voltage in some convenient range such as 0–10 volts proportional to the number of mass scans completed, using any convenient conversion gain such as 0.010 volts per scan completed. Alternatively, the functions of modules 52A, 52B, 52C may conveniently be incorporated in the computer and its interface, so that the functions detecting and counting mass scan number are performed by program software, and the function of converting mass scan number to an analog voltage is performed by a device of well known type and availability incorporated in the interface. In any case, this analog voltage is used to now control the first quadrupole control 53, which thus steps, at a rate determined by the interval between mass scans of the second quadrupole, thru the primary ion spectrum selected by the first quadrupole.

Several features standard to existing Gas Chromatography—Mass Spectrometry Data Systems may be conveniently used, with slightly different results, in this new area of mass spectrometry—collisional fragmentation—mass spectrometry. For example, any stored mass spectrum 55 will correspond to the fragment ion spectrum originating on a single species of primary ion. If the total ion intensity in all these fragment ion peaks is synthesized by having the computer add up all the peak intensities in one such spectrum, the result is essentially equal to the primary ion intensity at the time the fragment ion spectrum was recorded. Plotting this reconstructed primary ion intensity vs. mass scan number (or time) by means of the Reconstructed Gas Chromatogram feature common to most GC/MS Data Systems thus results in a reconstructed primary ion spectrum.

As used in the claims, a "leaky dielectric material" is one which has the characteristics of an insulator for the RF electric fields applied to quadrupoles for mass spectrometry and of an electrical conductor for the electrical fields produced by direct current and low scan frequency voltages utilized for quadrupole mass spectrometry. Such "leaky dielectric material" has a dielectric constant between about 1 and 50, a magnetic permeability between about 1 and 1000, and a resistivity in excess of about $10^5$ Ohm-cm. but not so high as to be unable effectively to conduct away current caused by ions striking the material.

Having described the invention, what I claim and desire to secure by Letters Patent of the United States is:

1. A system of mass spectrometry for the analysis of ions of a selected mass produced by mass spectrometry wherein the ions are subjected to collision fragmentation and the resulting ion particles are subjected to further mass anaylsis, the system comprising: an ion source for the sample molecules to be analyzed, a first quadrupole mass spectrometer adapted to receive ions from said source at its inlet and a second quadrupole mass spectrometer having its inlet proximate the outlet of said first mass spectrometer; a collision chamber between said mass spectrometers, said collision chamber comprising shielding means composed of a leaky dielectric material which has the characteristics of an insulator for RF electrical fields and of an electrical conductor for electrical fields produced by DC and low scan frequency voltages utilized for quadrupole mass spectrometry; and an ion detector adapted to receive ions from the outlet of said second quadrupole mass spectrometer.

2. A system according to claim 1 wherein said collision chamber comprises a cylindrical tube having cylindrical walls parallel to and interposed between the poles of said first and second mass spectrometers.

3. A system according to claim 2 wherein passage means is connected to the interior of said collision chamber, said passage means being connected at its other end to a source of collision gas.

4. A system according to claim 1 wherein biasing means are provided said collision chamber, said biasing means adapted to bias electrically said collision chamber whereby the collision energy of the ions selected by said first quadrupole mass spectrometer as they enter the collision chamber is controlled.

5. A system according to claim 4, wherein said biasing means is associated with means for producing an electrical drift field superimposed on said electrical bias.

6. A system according to claim 1, which further comprises an active GC-MS data system whereby said first quadrupole mass spectrometer is commanded by a signal derived from the scan number of said GC-MS data system to select a single ion mass from those present and to inject ions of said selected mass into said collision chamber.

7. A system according to claim 6, wherein a normal mass scanning function of the GC-MS data system controls said second quadrupole mass spectrometer whereby an ion spectrum of the fragment ions and other ions in said collision chamber is produced.

8. A system according to claim 6, in combination with a computer having software means which functions to provide a mass command signal which is proportional to the instantaneous scan number for said first quadrupole mass spectrometer.

9. A system according to claim 6, in combination with apparatus including means providing sequentially the functions of data system mass scan flyback detection, digital counting of said mass scan flyback events, and digital-to-analog conversion of said counter contents whereby an analog signal proportional to the instantaneous scan number and suitable for commanding the mass selected by said first quadrupole mass spectrometer is provided for commanding said selected mass.

10. A system according to claim 1 wherein said collision chamber is asymmetrically located with respect to said two quadrupole mass spectrometers, said collision chamber penetrating a relatively shorter distance into said first quadrupole mass spectrometer and a relatively longer distance into said second quadrupole mass spectrometer.

11. A system according to claim 10, wherein said collision chamber penetrates only into said second quadrupole mass spectrometer.

12. A system according to claim 1, wherein a gas inlet is located in said collision chamber at about the center thereof considering said collision chamber's length.

13. A system according to claim 1 wherein said collision chamber is electrically isolated from the eight rods of said two quadrupole mass spectrometers and from cases for said two quadrupole mass spectrometers, feedthroughs being provided for connectors, wires and vacuum through which the electrical potential of said collision chamber is controlled.

14. A system according to claim 1, including means for detecting mass scan flyback events by analog differentiation of the mass scan signal, resulting in one electrical pulse at the end of each mass scan.

15. A tandem quadrupole mass spectrometer for analyzing unknown mixtures which comprises: first and second quadrupole mass spectrometers arranged in tandem; means for operating said first and second quadrupole mass spectrometers to provide a scanning mass analysis for a selected range of atomic mass units; a collision chamber between said first and second quadrupole mass spectrometers, said collision chamber being in the form of a cylindrical tube and composed of a leaky dielectric material having a ratio of conductivity to dielectric constant whereby it has the characteristic of a conductor to the DC component of each quadrupole field and has the further characteristic of an conductor to the RF component of each quadrupole field whereby the RF field of the quadrupole penetrates inside said collision chamber but the DC field of each said quadrupole is shielded from such penetration by the walls of said cylindrical tube; means for introducing a collision gas into said collision chamber; and an ion source which ionizes the mixture to be analyzed; means for introducing said ions produced by said ion source into said first quadrupole mass spectrometer; a detector means for detecting the ion spectrum produced by said second quadrupole mass spectrometer.

16. A method for analyzing components in a mixture by mass spectroscopy wherein two quadrupole mass spectrometers are utilized which comprises the steps of: ionizing at least part of said mixture to be analyzed; mass scanning ions produced in the preceding step by a first quadrupole mass spectrometer and selecting from said scanning at least one ion mass characteristic of said mixture; directing ions selected in the foregoing step at relatively low ion energies into a collision chamber which is located between said two quadrupole mass spectrometers, said collision chamber shielding said ions therein from the DC component produced by said quadrupole mass spectrometers and permitting the RF electrical fields to penetrate therein, a collision gas being introduced into said collision chamber whereby fragment and other ions produced as a result of collisions between said selected ions and said collision gas are produced; mass scanning the fragment and other ions produced in the foregoing step for each ion mass selected in the earlier mass scanning step; and mass scanning the ions selected in the foregoing step to produce a mass spectrum for comparison with known reference spectra whereby the components of said mixture are identified.

17. A method according to claim 16 including the step of controlling the collision energy of ions entering the collision chamber by electrically biasing said collision chamber.

18. A method according to claim 16 wherein the mass scanning of said first quadrupole mass spectrometer is commanded by a signal derived from the scan number of an active GC-MS data system to select a single ion mass from those present and inject ions of said mass into said collision chamber.

19. A method according to claim 18, wherein the normal mass scanning function of the GC-MS data system controls the mass scanning of said second quadrupole mass spectrometer whereby the fragment and other ion spectrum of the ions selected by said first quadrupole mass spectrometer scanning is selected at the output of said second mass quadrupole mass spectrometer.

20. A method according to claim 18 wherein said signal is derived by augmentation of a computer software data system interfaced directly to provide the required mass command signal which is proportional to the instantaneous scan number for said first quadrupole mass spectrometer.

21. A method according to claim 18 wherein said signal is derived by ancillary apparatus providing sequentially the functions of data system mass scan flyback detection, digital counting of said mass scan flyback events, and digital-to-analog conversion of said counter contents, whereby an analog signal proportional to the instantaneous scan number is produced which is suitable for commanding the mass selected by said first quadrupole mass spectrometer.

* * * * *